(12) United States Patent
Banyard et al.

(10) Patent No.: US 6,406,730 B1
(45) Date of Patent: Jun. 18, 2002

(54) PROCESS FOR PRODUCING LOW ACID FOOD PRODUCTS

(76) Inventors: Carl E. Banyard, 40 E. 9th St., #1008, Chicago, IL (US) 60605; Richard S. Hornack, 9816 Farley La., Overland Park, KS (US) 66212; Michael W. Evon, 514 Monroe Ave., River Forest, IL (US) 60305

( * ) Notice: Subject to any disclaimer, the term of this patent is extended or adjusted under 35 U.S.C. 154(b) by 0 days.

(21) Appl. No.: 09/452,515

(22) Filed: Dec. 1, 1999

Related U.S. Application Data

(60) Provisional application No. 60/110,352, filed on Dec. 1, 1998.

(51) Int. Cl.[7] .......................... A23B 4/12; A23L 1/0532
(52) U.S. Cl. ................. 426/330.3; 426/324; 426/330.5; 426/590; 426/594; 99/317; 99/309
(58) Field of Search .......................... 426/330.5, 330.3, 426/590, 594, 324; 99/317, 309

(56) References Cited

U.S. PATENT DOCUMENTS

| | | |
|---|---|---|
| 2,802,599 A | 8/1957 | Callahan et al. |
| 3,328,178 A | 6/1967 | Alderton |
| 3,457,083 A | 7/1969 | Kawai et al. |
| 3,539,359 A * | 11/1970 | Murchison et al. ......... 426/324 |
| 3,773,961 A | 11/1973 | Gordon |
| 4,079,154 A | 3/1978 | Yasumatsu |
| 4,235,936 A | 11/1980 | Kahn et al. |
| 4,552,772 A | 11/1985 | Saitoh et al. |
| 4,756,919 A | 7/1988 | Cirigiano et al. |
| 4,797,293 A | 1/1989 | Evans et al. |
| 4,814,193 A | 3/1989 | Shenouda et al. |
| 4,830,870 A | 5/1989 | Davis, Jr. et al. |
| 4,927,657 A | 5/1990 | Antaki et al. |
| 4,983,409 A | 1/1991 | Nasu |
| 5,057,330 A * | 10/1991 | Lee et al. .................... 426/324 |
| 5,260,085 A | 11/1993 | Wisler et al. |
| 5,417,994 A | 5/1995 | Chang et al. |
| 5,474,793 A | 12/1995 | Meyer et al. |
| 5,562,938 A | 10/1996 | Lee et al. |
| 5,562,941 A | 10/1996 | Levy |
| 5,665,415 A | 9/1997 | Kligerman et al. |
| 5,670,197 A | 9/1997 | Adrainson et al. |
| 5,780,092 A | 7/1998 | Agbo et al. |
| 5,780,288 A | 7/1998 | Rohwer |
| 5,853,787 A | 12/1998 | Gurol |

* cited by examiner

Primary Examiner—Helen Pratt
(74) Attorney, Agent, or Firm—Crowe & Dunlevy, P.C.

(57) ABSTRACT

The present invention comprises a method and apparatus for treating a low acid food product. The low acid food product is first acidified to produce an acidified food product and then packaged as the acidified food product. The acidifying step comprises addition of a GRAS acid to adjust the pH to below about 4.5. The acidified food product is then deacidified to return the acidified food product to the low acid food product having a pH above 4.6. The deacidification is accomplished through the addition of an alkaline substance in an amount sufficient to deacidify the acidified food product to a pH of from about 5.8 to about 7.5.

7 Claims, 2 Drawing Sheets

PROCESS FOR PRODUCING LOW ACID FOOD PRODUCTS

RELATED APPLICATIONS

This application claims the benefit of U.S. Provisional Application Ser. No. 60/110,352, entitled PROCESS FOR PRODUCING LOW ACID FOOD PRODUCTS, filed Dec. 1, 1998, which is hereby incorporated by reference.

FIELD OF THE INVENTION

The present invention relates generally to a process and apparatus for producing low acid food products and, more particularly, but not by way of limitation, to a process and apparatus by which a naturally low acid food product can be acidified for storage and later de-acidified at the point of dispensing for consumption or freezing in suitable equipment.

BACKGROUND OF THE INVENTION

The Code of Federal Regulations ("CFR") governs many, if not most, aspects of food processing. Specifically, the CFR sets forth distinctions between "low-acid" foods and so called "acidified" foods. According to 21 CFR §114.3, the phrase "low-acid foods" means any foods, other than alcoholic beverages, with a finished equilibrium pH greater than 4.6 and a "water activity" ($a_w$) greater than 0.85. Low acid foods include milk, ice cream, creamers, and milk and/or vegetable fat containing beverages such as flavored cappuccino beverages. Special processing, packaging and handling of these products is necessary to prevent premature spoilage and the growth of microorganisms of public health significance. Current processing standards for unrefrigerated low acid foods require the application of a "minimum thermal process" with the application of heat to food, either before or after sealing in a hermetically sealed container, for a period of time and at a temperature scientifically determined to be adequate to ensure destruction of microorganisms of public health significance.

The phrase "acidified foods" means low-acid foods to which acid(s) or acid food(s) are added and which have a water activity ($a_w$) greater than 0.85 and have a finished equilibrium pH of 4.6 or below. These foods include cucumbers, cabbage, artichokes, etc. These foods may be called "pickled." Acidity and salt levels are important factors retarding the growth and survival of bacteria and other microorganisms in acidified foods. Acidified food may be thermally processed, or processed with permitted preservatives to destroy vegetative cells of microorganisms of public health significance and to inhibit the reproduction of microorganisms of non-health significance.

Permitted chemical preservatives, pH and the water activity ($a_w$) management of food products are important factors in extending food preservation beyond simple "pickling." It is well known in the art that the combination of permitted preservatives, pH and water activity ($a_w$) management of a food product can essentially prevent microbial growth. Water activity ($a_w$) is defined as a measure of the free moisture in a product and is the quotient of the water vapor pressure of the substance divided by the vapor pressure of pure water at the same temperature. Water activity ($a_w$) management is a beneficial preservation technique in cases when a bacterial cell comes in contact with a food product of relatively low water activity, such that the bacterial cell dehydrates, thereby inhibiting bacterial growth. Such dehydration of the bacterial cell occurs as a result of osmotic dehydration, during which time water transfer occurs between the food substance and the bacterial cell until equilibrium is reached, i.e., until both the food substance and the bacterial cell have the same water activity ($a_w$). It is important to note that water activity ($a_w$) is not proportional to moisture content of a substance. In fact, it is water activity ($a_w$) and not moisture content that influences microbial growth. The challenge of food product design and formulation is to achieve relatively low water activity ($a_w$) so that when the product comes in contact with bacterial cells, the level at which equilibrium is reached is low enough to inhibit almost all kinds of microbial growth. Therefore, it is essential in food chemistry to measure and monitor the water activity ($a_w$) of a food substance as an aid in preventing spoilage.

Low acid food products require special processing, packaging and handling procedures (for example, aseptic processing and packaging; retort processing; or thermal processing with subsequent refrigeration), which add significantly to the cost of producing, distributing, and dispensing such low-acid food products. Acidified foods avoid much of these processing requirements and are, therefore, more economical to produce and store. Currently, a range of products such as non dairy creamers, frozen and iced cappuccino products, etc. are produced and are commercially viable only as low-acid foods. Low-acid versions (which are processed and packaged aseptically or are stored under refrigeration) are preferred by the market because of taste, texture and overall quality considerations. Acidified versions of these types of products suffer from poor taste and a lack of characteristic "dairy flavor notes" and creaminess that comes with fat, protein and other non-dairy solids.

Thus, efforts to develop high quality and shelf stable liquid concentrates that have "low acid flavor profiles" when reconstituted are a major objective of food and beverage companies, especially those who do not have aseptic processing capabilities.

SUMMARY OF THE INVENTION

The present invention comprises a method and apparatus for treating a low acid food product. The low acid food product is first acidified to produce an acidified food product and then packaged as the acidified food product. The acidifying step comprises addition of a GRAS acid to adjust the pH to below about 4.5. The acidified food product is then deacidified to return the acidified food product to the low acid food product having a pH above 4.6. The deacidification is accomplished through the addition of an alkaline substance in an amount sufficient to deacidify the acidified food product to a pH of from about 5.8 to about 7.5.

An automatic dispensing device for dispensing the acidified food product in its original low acid form comprises a water supply, an alklaine container containing an alkaline solution and a syrup container containing acidified syrup product. A pump operably connected to the syrup container pumps the acidified syrup product from the syrup container and into a mixing head. A vacuum switch operably connected between the syrup container and the pump disengages the automatic dispensing device when the syrup container is empty. The mixing head includes a single solenoid with a water input port, a syrup input port and an exit port for receiving and admixing the water and syrup product to create reconstitute. A venturi operably connected between the exit port and the alkaline container supplies the alkaline solution to the reconstitute through a metering solenoid. The metering solenoid is operably coupled to the venturi for metering the alkaline solution through the venturi to deacidify the reconstitute. A beverage tank receives the deacidified reconstitute and delivers the deacidified reconstitute as a beverage. A probe displaced within the beverage tank actuates the pump when the probe detects that the level of deacidified reconstitute is below a predetermined level.

DETAILED DESCRIPTION OF THE INVENTION

Figure 1:
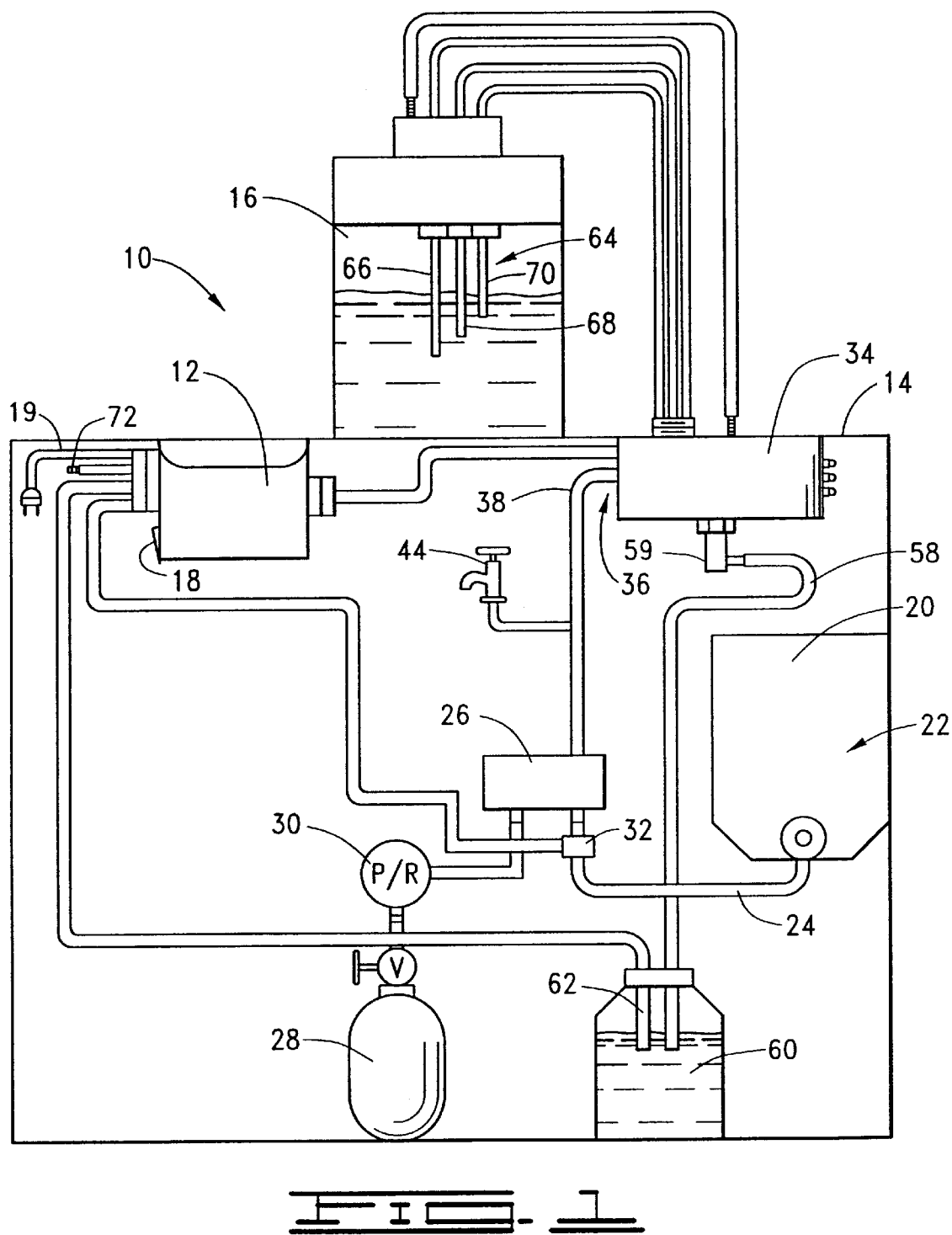
FIG. 1 is a elevational view of the dispensing device of the present invention.

The present invention relates to a process and apparatus allowing naturally low-acid foods to benefit from the less stringent processing requirements for acidified foods while retaining the more pleasing taste characteristics that low-acid foods naturally enjoy. The "acidified low acid foods" (ALAF's) of the present invention are generally speaking, liquid products that are formulated to be post mix concentrates that require reconstitution with another liquid (esp. water) and pH adjustment to render palatable. When the ALAF is concentrated, preserved, and in acidified form, the product does not support microbial growth. The microorganism, *Clostridium botulinium*, for example, stops growing at a water activity of less than 0.95. Yeasts and molds tend to be more resistant to water activity of around 0.90, but to stop yeasts and molds, it is necessary to lower water activity to as little as 0.7 to 0.75. *Staphylococcus aureus, Clostridium perfringens, Bacillus cereus* and *Clostridium botulinium* are all very dangerous pathogenic bacteria in food. With the exception of *Staphylococcus aureus*, most pathogenic bacteria in food can be inhibited by water activity levels of less than 0.92 to 0.80. *Staphylococcus aureus* is inhibited at around a water activity of 0.85.

Therefore, it is essential in this invention when formulating low acid foods that are acidified in processing to measure and monitor the water activity ($a_w$) of a food substance to prevent spoilage.

Acidity is also an important factor affecting the growth and survival of bacteria and other micro-organisms in food. Microorganisms are sensitive to pH, just as they are susceptible to dehydration at low relative water activity ($a_w$). Foods that are strongly acidic (below 4.5 pH) and strongly alkaline (above 12.0 pH) represent a hostile environment for most bacteria. The use of chemical preservatives, pH and low water activity can be used in the formulation of ALAF's to render the food product resistant to microbial growth when packaged properly.

In a preferred embodiment, the process involves first acidifying a low-acid food product to bring the equilibrium pH of the food product to about 4.6 or below. A naturally low-acid product (with an amount of chemical preservatives added that do not exceed GRAS maximums) is prepared using conventional manufacturing techniques. The pH of the low-acid food product prepared in this manner is referred to as the "natural pH" of the low-acid food. The natural pH of the food product is preferably noted or recorded for future reference.

By definition, the low-acid product prepared in such a conventional manner will have a natural pH of greater than 4.6 and relatively low viscosity. The low-acid food product is acidified to a pH of about 4.6 or less by addition of a suitable acid. The pH is preferably below 4.6, as the this is the range *Clostridium botulimum*, the most dangerous and most heat resistant of the food poisoning bacteria, is inhibited from growth. Preferred ranges for modification of the pH will vary depending upon the particular food item being acidified and the effect upon taste characteristics, but the pH range for most food products will generally fall within the preferred range of from about 3.6 to about 4.6, with a pH of 4.4 to 4.6 particularly preferred.

The acid used for acidification should be selected to be compatible with the food item being treated. Generally, though, any GRAS (generally regarded as safe) acid will be suitable for acidification. In fact, use of acids that occur naturally when the low acid food ferments (spoils) are preferable in preventing off flavors that can result from the acid itself. Phosphoric, acetic, citric, maleic and lactic acids have been found to yield acceptable results with a range of food products. Lactic acid is particularly preferred in dairy food products because the neutralization of the lactic acid produces derivative compounds that are more naturally associated with dairy products. Once acidification has been accomplished, the food item may be processed, packaged and shipped as an acidified food product (i.e., with no requirement for refrigeration or aseptic packaging).

An undesired effect of acidifying a low acid food with a water activity ($a_w$) of $\leq 0.90$ is a significant increase in viscosity. For example, the un-acidified low acid food may have a viscosity of 300 centipoise at its natural pH of 6.2. When acidified to a pH below 4.6, viscosity will increase to more than 8000 centipoise. There appear to be three major components of the thickening. The first component, hydrogenation, is the result of hydrogen ions (dissociated from the acid/water interaction) which break the double bonds on the carbons of the unsaturated fatty acids to create a saturated fatty acid. When partially hydrogenated vegetable fats are used in the low acid formulations, the thickening results from the migration of dissociated hydrogens ions to the partially hydrogenated fatty acid chains. It is the saturated condition of the vegetable fat that contributes most to the viscosity increases.

The second component of thickening is the tendency of protein to denature as it reaches its isoelectric point. The third component of thickening is a reduction in the free water in the acidified low acid food due to the interaction with the acid.

The use of long chain polyphosphates such as sodium hexametaphosphate (glassy H), alginates such as propylene glycol alginate(PGA), and humectants such as glycerine help to stabilize the mixture and prevent the ALAF from becoming too viscous to pump. While it may seem counter intuitive to add a gum to an acidified low acid food that is already too thick, propylene glycol alginate may be useful in binding hydrogen ions. Upon dissolving alginates in water, normally the molecules hydrate and the solution gains viscosity. However, in the present invention, a novel characteristic of PGA is to reduce the viscosity of the acidified food product. The hydrogenation that occurs with the PGA helps to protect fats and proteins thereby reducing the viscosity of the food product.

In the preferred embodiment, effective levels include up to 3% by weight of phosphates, up to 0.4% by weight PGA, and up to 4% glycerine. Preferably, the present invention uses propylene glycol alginate at a concentration of up to 0.1 percent by weight, sodium hexametaphosphate at a concentration of up to 1.5 percent by weight and glycerin at a concentration of up to 2.5 percent by weight to reduce the viscosity of the acidified food product. It should be understood that the level and combination of these ingredients in reducing the viscosity while stabilizing solution will vary depending on the percent fat and protein in the ALAF. A person of ordinary skill in the art will understand, however, that various other humectants are also within the scope of this invention in reducing viscosity and lowering water activity.

When it is desired to consume the food product at the point of delivery, the food product is then "de-acidified" by addition of a base, or alkaline solution, to raise the pH to near the natural pH for the low-acid food product and convert the acidified food product back to a low-acid food product. In one embodiment, the base is provided with the acidified product for addition thereto by the buyer or consumer. Any suitable base may be used for the de-acidification process, however, selection of an appropriate base should include consideration and investigation of the effect such base will have upon the taste characteristics of the particular food item undergoing treatment. Sodium and potassium hydroxides and combinations thereof have been found to be particularly advantageous.

The de-acidification process improves the flavor characteristics of the food product in comparison to the acidified form of the food product. Food items treated in this manner enjoy taste characteristics comparable to low-acid food products that have not undergone the acidification/de-acidification process, yet enjoy the processing, packaging and shipping advantages of acidified foods. Further details regarding preferred embodiments of the invention may be determined from an examination of the following examples.

EXAMPLE 1

In this example, a representative low acid coffee beverage is described. The product is a 3+1 concentrate that, when reconstituted with 3 parts water to 1 part concentrate will yield a beverage of 18 brix, ready for freezing or direct consumption. The concentrate contains no additives to manage viscosity.

| Ingredient | % w/w | % TS | % Fat |
|---|---|---|---|
| Water | 20.10 | .00 | |
| Sodium Benzoate | .08 | .07 | |
| Potassium Sorbate | .08 | .07 | |
| Phosphate, Glassy H | 0.00 | 0.00 | |
| Non dairy Creamer | 14.55 | 13.96 | 7.53 |
| Milk solids non fat (MSNF) | 4.26 | 4.01 | .06 |
| Sugar | 11.96 | 11.48 | |
| Maltodextrin 10 DE | 3.06 | 2.94 | |
| High Fructose Corn Syrup | 39.74 | 27.82 | |
| Propylene Glycol Alginate | 0.00 | 0.00 | |
| Glycerine | 0.00 | 0.00 | |
| Coffee Extract | 6.03 | 2.82 | |
| Flavorings | .14 | .04 | |
| Lactic Acid 88% | 0.00 | 0.00 | |
| TOTALS | 100.00 | 63.21 | 7.59 |

A liquid concentrate having the above composition is prepared as described below:

To a 100 gallon mixing tank (inter-connected with a tri-blender) add 24 gallons of water. Prepare a pre-blend of powders including 0.78 pounds of sodium benzoate; 0.78 pounds of potassium sorbate; 12.7 pounds sodium hexametaphosphate (glassy H); 36.7 pounds of maltodextrin 10DE; 144.5 pounds of non dairy creamer (53% fat); 118.8 pounds of granulated sugar; 42.3 pounds of reduced minerals whey. Start tri-blender and begin the re-circulation of water. Take the pre-blend of powders listed above and slowly add through funnel into the tri-blender. After all powder blend is in solution, add 35.1 gallons of high fructose corn syrup 42 while agitating at medium speed, next add 5.94 gallons of coffee extract and 0.164 gallons of vanilla flavoring. Mix concentrate from approximately 20 minutes. Test mixture for total solids, viscosity (using a Brookfield LVF viscometer), pH, and water activity.

Based on prior testing, the above described 100 gallon batch will have the following general characteristics:

| | |
|---|---|
| Total Solids: | 62.9 |
| PH: | 6.1 |
| Viscosity: | 320 cps |
| Water Activity | .90 |

To demonstrate the impact of acidifying a low acid product without additives to manage rheology, 1000 grams of the above concentrate is acidified to a pH of 4.5. The acidification should be done slowly while the product is being stirred and pH is being monitored. Approximately 7 milliliters of lactic acid will be required. Product thickening will be severe so mixer speed will need to be increased to properly blend the acidified product.

Based on prior testing, the above described 1000 grams will have the following general characteristics:

| | |
|---|---|
| Total Solids: | 62.9 |
| PH: | 4.5 |
| Viscosity: | 9000 cps |
| Water Activity | n/a |

This product generally can not be pumped using conventional dispensing equipment technology.

EXAMPLE 2

In this example, the low acid coffee beverage concentrate of Example 1 is supplemented with three ingredients (sodium hexametaphosphate, propylene glycol alginate, and glycerine) which reduces the viscosity of the system when acidified.

| Ingredient | % w/w | % TS | % Fat |
|---|---|---|---|
| Water | 19.33 | .00 | |
| Sodium Benzoate | .08 | .07 | |
| Potassium Sorbate | .08 | .07 | |
| Phosphate, Glassy H | 1.23 | 1.18 | |
| Non dairy Creamer | 13.98 | 13.43 | 7.38 |
| Milk solids non fat (MSNF) | 4.09 | 3.93 | .06 |
| Sugar | 11.50 | 11.04 | |
| Maltodextrin 10 DE | 2.97 | 2.85 | |
| High Fructose Corn Syrup | 38.21 | 26.74 | |
| Propylene Glycol Alginate | 0.09 | 0.09 | |
| Glycerine | 2.50 | 1.60 | |
| Coffee Extract | 5.80 | 2.71 | |

-continued

| Ingredient | % w/w | % TS | % Fat |
| --- | --- | --- | --- |
| Flavorings | .14 | .04 | |
| Lactic Acid 88% | 0.00 | 0.00 | |
| TOTALS | 100.00 | 63.75 | 7.45 |

Based on prior testing, the above described 1000 grams will have the following general characteristics before acidification.

| | |
| --- | --- |
| Total Solids: | 63.4 |
| PH: | 6.1 |
| Viscosity: | 420 cps |
| Water Activity | .89 |

After acidification the product is capable of being pumped by the dispensing apparatus later described.

| | |
| --- | --- |
| Total Solids: | 63.4 |
| PH: | 4.5 |
| Viscosity: | 1800 cps |
| Water Activity | .87 |

The coffee beverage concentrate can be reconstituted for consumption by mixing 1 part acidified syrup to 3 parts water. Immediately after reconstitution with water, an aqueous solution of sodium hydroxide (10% w/w) is added to the reconstitute sufficient to raise the pH of the product to a target pH of 6.5–7.0. By restoring the reconstitute to a low acid pH value, good coffee flavor and creamy dairy analogues are restored.

In a particularly preferred embodiment, de-acidification is accomplished using an apparatus, such as a specialized beverage dispensing device, which reconstitutes the acidified food product to the desired brix and simultaneously admixes an alkaline dilute to adjust the pH of the product to near neutral (ph 7.0). The present embodiment provides for automatic metering and precision control of the dispensing of the acidified low acid food product in the form of an acidified syrup, the water, and the alkali solution, to create a quality product.

In particular, FIG. 1 shows a perspective view of a dispensing device 10 of the present invention. The dispensing device 10 includes a control box 12 with circuitry generally known to a person of ordinary skill in the art to operate the dispensing device 10. The control box 12 is preferably attached underneath of a counter 14 upon which a product dispenser 16 rests. The control box 12 should be mounted so that an on/off switch 18 is readily accessible. A power cord 19 is also included to connect the dispensing device 10 to a power source. The product dispenser 16 can be constructed of various materials, but is preferably made of plastic or stainless steel. The product dispenser will preferably contain refrigeration means to either agitate and freeze product to a slushy consistency or maintain the reconstitute at a temperature below 40° F.

Continuing with FIG. 1, a syrup container 20, which contains acidified low acid syrup product 22 is attached to the wall or door of the counter 14. Any suitable syrup container such as a bag-in-box arrangement as commonly used in the art may be utilized to contain the acidified low acid syrup product 22. In practice, the bag should be back flushed with nitrogen to slow oxidative effects on product freshness. A syrup line 24 connects the syrup container 20 to a piston pump 26 which pulls the syrup product 22 out of the syrup container 20 so that the syrup product 22 flows into the intake side of the piston pump 26. The piston pump 26 is made of sturdy construction and is capable of pumping highly viscous and particulate containing syrup. The piston pump 26 (such as the ShurFlo condiment/particulate pump #166-200-10, manufactured by ShurFlo and available through Beverage Equipment Supply Company of Holland, Ohio) is operably coupled to a carbon dioxide container 28 which drives the piston pump 26 to pull the syrup product 22 out of the syrup container 20. Persons skilled in the art will also recognized that air can replace carbon dioxide in driving the piston pump 26 and that various other types of pumps would be equally suitable. A pressure regulator 30 attached to the carbon dioxide container 28 can be manually adjusted to regulate the release of carbon dioxide.

Of particular interest is a vacuum switch 32 (such as the Flojet Corporation, Irvine, Calif. vacuum switch #20 95-536) of the present invention. Since the device 10 must be shut down if the acidified syrup product 22 runs out, the vacuum switch 32 is operably connected between the syrup container 20 and the piston pump 26 to detect downstream negative pressure. In particular, when the piston pump 26 pulls syrup product 22 from the syrup container 20, a positive pressure results between the piston pump 26 and the syrup container 20. However, if little to no syrup product 22 remains in the syrup container 20, a negative pressure in excess of a predetermined amount will result in attempting to pull from an empty bag. Therefore, once the vacuum switch 32 detects that such negative pressure has exceeded the predetermined amount, in the present invention, preferably about 15 psi, the vacuum switch 32 shuts off. The vacuum switch 32 is operably connected to the control box 12 so that detection of negative pressure exceeding about 15 psi results in the control box 12 shutting down the automatic dispensing device 10, and illuminating a fault LED.

Figure 2:
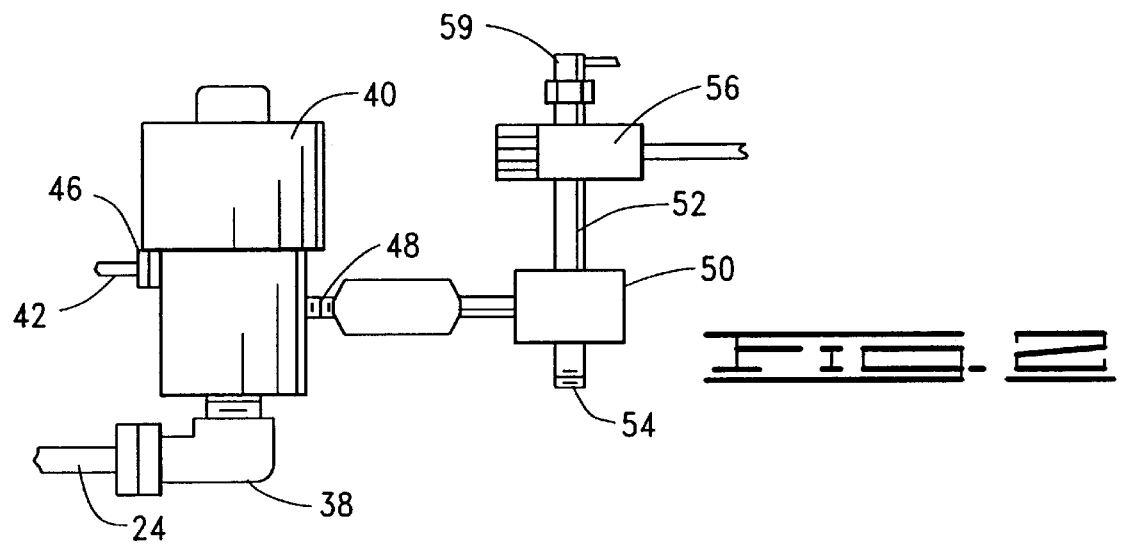
FIG. 2 is a partial cross-sectional elevational view of the mixing head of FIG. 1 of the present invention
Figure 3:
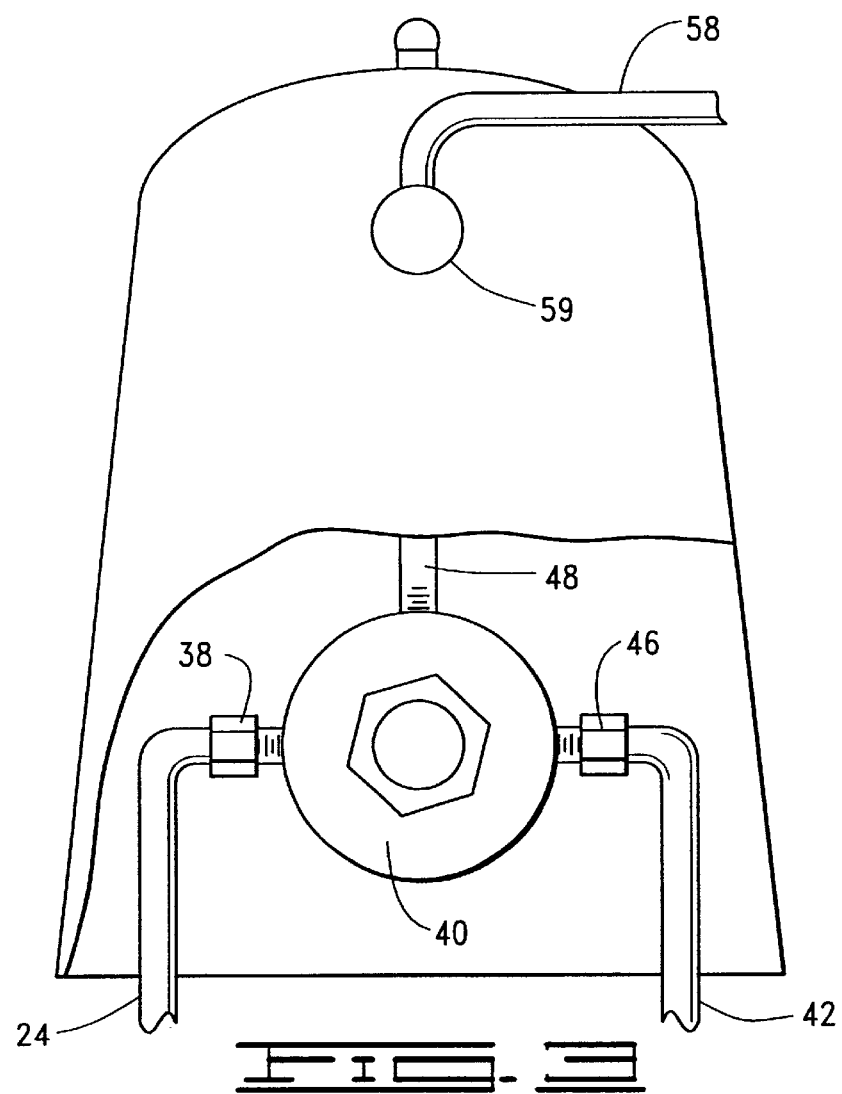
FIG. 3 is a partial cut-away top plan view of the mixing head of FIG. 1 of the present invention.

In operation, the piston pump 26 pushes the syrup product 22 upstream into a mixing head 34 if the level of syrup product 22 is adequate and therefore the vacuum switch 32 is not engaged. Turning now to FIG. 2, shown in greater detail is a cross-sectional, elevational view of the mixing head of 34 of FIG. 1. The mixing head 34 is activated by a control switch 36 operably connected to the control box 12. Viewing FIGS. 1 and 2, the mixing head 34 further includes a syrup input port 38 which receives the syrup line 24. A single normally closed electrically operated solenoid 40 (such as manufactured by Precision Dynamics, Inc. New Britian, Conn., Solenoid #D2016-S78) is displaced within the mixing head 34 for receiving the syrup product 22 from the syrup line 24. A check valve (not shown) is placed in the syrup line 24 to prevent back flow of syrup product 22 after the syrup product 22 is pushed into the syrup input port 38 by the piston pump 26. Simultaneously, a water input line 42 containing water from a faucet 44, enters the mixing head 34 into a water input port 46. A check valve (not shown) is placed in the water input line 42 to prevent back flow of water. The water input port 46 is placed in opposing relationship with the syrup input port 38 so that the water input port 46 and syrup input port 38 are 180 degrees apart, as seen in the partial cut-away top plan view of FIG. 3. Controlled by the control box 12, the solenoid 38 admixes the acidified syrup product 22 with water to create reconstitute.

An exit port 48 disposed at the center line of the syrup input port 38 and the water input port 46 (FIG. 3) releases the admixed reconstitute into a conventional venturi 50 (such as manufactured by Air-Vac Engineering Company, Inc. Seymour, Conn. with Part number DAVR093LQT) operably connected to the exit port 48. The venturi 50, constructed in accordance with conventional practice, generates negative pressure within a venturi chamber 52, while re-directing the reconstitute at a 90 degree angle into a discharge port 54. Simultaneously, a normally closed metering solenoid 56 (of the type manufactured by Precision Dynamics, Inc. New Britian, Conn., Solenoid #A3114-S26) operably coupled to the venturi 50, draws alkaline solution from an alkaline solution line 58 disposed within an alkaline container 60. The alkaline solution is drawn into the venturi chamber 52 through a quick release valve 59 extending out of the mixing head 34. It is contemplated to be within the scope of the present invention to use pumping means other than a venturi 50. The amount of alkaline solution is metered through the venturi 50 to be admixed with the reconstitute to adjust the pH of the reconstitute before the reconstitute exits the discharge port 54 into the product dispenser 16. In essence, the addition of alkaline solution deacidifies the acidified reconstitute so that the reconstitute is restored to its original organoleptic characteristics including taste and smell. To ensure that no de-acidified reconstitute remains in the discharge port 54, solenoid 56 vents to atmosphere in the normally closed position allowing the discharge port 54 to drain completely.

The level of alkaline solution is monitored by a probe 62 operably connected to the control box 12 and disposed within the alkaline solution container 58. The control box 12 includes a separate control board (not shown) which detects the level of the alkaline solution in the alkaline container 60 through the probe 62, and if such level is below a predetermined level, the dispensing device 10 is shut down and an LED illuminates on the mixing head 34 until more alkaline is added. The present invention therefore advantageously monitors the availability of alkaline solution and acidified syrup to prevent out of specification reconstitute from entering the product dispenser 16. Therefore, the control logic of dispensing device 10, requires that both acidified syrup and acid neutralizer be available in order that reconstituted syrup of desired pH is dispensed into the product dispenser 16. Solenoid 40 and the metering solenoid 56 must be simultaneously actuated in order to discharge reconstituted, deacidified product. Solenoid 40 and the metering solenoid 56 will actuate only if acid syrup and acid neutralizer are available for admixing.

In the preferred embodiment, a final product probe 64 is displaced within the product dispenser 16 to measure the level of final product in the dispenser 16. The final product probe 64 includes a first wire 66, a second wire 68, and a third wire 70, all of which are operably coupled to the mixing head 34. The first wire 66 is of a length such that the first wire 66 acts as a ground control and is always immersed within the product in the product dispenser 16. The second wire 68 is of slightly shorter length than the first wire 66, with the third wire 70 being of shortest length. The wires 66, 68, and 70 cooperatively operate to detect the level of product and therefore control the dispensing device 10. In particular, only when second wire 68 and third wire 70 are not immersed within the product in the product dispenser 16 will the dispensing device 10 be activated.

The present invention discloses a novel apparatus for dispensing deacidified, reconstituted product from an acidified low acid syrup. In the preferred embodiment, a system including a vacuum switch 32 for detecting the level of syrup product 22 prevents the possibility of dispensing water when the syrup product 22 has run out. Moreover, the metering solenoid 56 vents to the atmosphere upon detection of an empty syrup container 20. A probe 62 within the alkaline solution meters the level of alkaline so that once the level of alkaline solution is low to empty, the dispensing device 10 is deactivated to avoid dispensing an acidified product. Finally, to prevent overflow and detect the need to activate the dispensing device, a final product probe 64 monitors the level of final product in the product dispenser 16. If the level is below a predetermined level, solenoid 40 is actuated allowing syrup product 22 and water 44 to flow.

The present invention is adaptable to allow for multiple heads and control boxes to admix different products into different dispensers 16. The wire 72 provides a jumper cable for connection of additional control boxes should more than one mixing head be utilized. Moreover, the present invention is adaptable to dispense multiple flavors from a neutral base as a result of adding flavoring and coloring to the acid neutralizer solution. By similar adaptation, high acid products may be admixed which do not need to be de-acidified.

It will be clear that the present invention is well adapted to attain the ends and advantages mentioned as well as those inherent therein. While presently preferred embodiments have been described for purposes of disclosure, numerous changes may be made which will readily suggest themselves to those skilled in the art and which are encompassed in the spirit of the invention disclosed.

Definitions:

Low acid foods means any foods other than alcoholic beverages, with a finished equilibrium pH greater than 4.6 and a water activity (a) greater than 0.85. Tomatoes and tomato products having a finished equilibrium pH less than 4.7 are not classified as low-acid foods.

Aseptic processing means the filling of a commercially sterilized product into pre-sterilized containers, followed by aseptic hermetic sealing, with a pre-sterilized closure, in an atmosphere free of microorganisms. Means of aseptic processing include 1) still reports; 2) agitating retorts; 3) hydrostatic retorts; 4) aseptic processing & packaging systems 5) flame sterilizers 6) water activity management & thermal processing 7) other systems.

Acid foods mean foods that have a natural pH of 4.6 or below.

Acidified foods means low acid foods to which acid(s) or acid acid food(s) have been added. They have a water activity (a) greater than 0.85 and have a finished equilibrium pH of 4.6 or below. These foods may be called or purport to be, "pickles" or "picked foods". Carbonated beverages are usually not included.

PH the term "pH" is used to designate the intensity or degree of acidity. The value of pH, the logarithm of the reciprocal of the hydrogen ion concentration in solution, is usually determined by measuring the difference potential between two electrodes immersed in a sample solution.

What is claimed is:

1. A method of treating a low acid food product comprising the steps of:
    acidifying a low acid food product to produce an acidified food product;
    adding an alginate to reduce viscosity of the acidified food product;
    packaging the acidified food product; and
    deacidifying the acidified food product to return the acidified food product to the low acid food product at a pH above 4.6.

2. The method of claim 1, wherein the alginate is propylene glycol alginate in an amount of up to about 0.1 percent by weight.

3. A method of treating a low acid food product comprising the steps of:
- acidifying a low acid food product to produce an acidified food product;
- adding a source of phosphate in an amount sufficient to reduce viscosity and buffer the pH of the acidified food product;
- packaging the acidified food product; and
- deacidifying the acidified food product to return the acidified food product to the low acid food product at a pH above 4.6.

4. The method of claim 3, wherein the source of phosphate is sodium hexametaphosphate in an amount of up to about 3 percent by weight.

5. A method of treating a low acid food product comprising the steps of:
- acidifying a low acid food product to produce an acidified food product;
- adding a humectant to stabilize the acidified food product and reduce viscosity of the acidified food product;
- packaging the acidified food product; and
- deacidifying the acidified food product to return the acidified food product to the low acid food product at a pH above.

6. The method of claim 5, wherein the humectant is glycerine in amount of up to about 2 percent by weight.

7. A method of treating a low acid food product in the form of a concentrate comprising the steps of:
- acidifying a low acid food product to produce an acidified food product;
- packaging the acidified food product;
- mixing the acidified product with water to produce a reconstituted acidified food product; and
- deacidifying the acidified food product with the addition of an alkaline substance to return the acidified food product to the low acid food product at a pH above 4.6.

* * * * *